United States Patent [19]

Dejewski

[11] Patent Number: 5,062,101
[45] Date of Patent: Oct. 29, 1991

[54] DATA ACQUISITION SYSTEM

[75] Inventor: Michael P. Dejewski, Franklin, Wis.

[73] Assignee: Johnson Service Company, Milwaukee, Wis.

[21] Appl. No.: 384,156

[22] Filed: Jul. 21, 1989

[51] Int. Cl.[5] .............................................. H04J 14/00
[52] U.S. Cl. ..................................... 359/135; 359/174
[58] Field of Search ..................... 370/4; 318/778, 436, 318/808, 473; 340/825.15; 455/601, 606

[56] References Cited

U.S. PATENT DOCUMENTS

| | | | |
|---|---|---|---|
| 3,838,223 | 9/1974 | Lee et al. | 379/286 |
| 3,910,257 | 10/1975 | Fletcher | 128/670 |
| 4,112,416 | 9/1978 | Hasegawa et al. | 340/825.15 |
| 4,198,701 | 4/1980 | Reddersen et al. | 360/102 |
| 4,408,307 | 10/1983 | Harris | 455/606 |
| 4,440,979 | 4/1984 | McGibbon | 379/286 |
| 4,703,325 | 10/1987 | Chamberlin et al. | 340/825.15 |
| 4,727,359 | 2/1988 | Uuchi et al. | 340/825.08 |
| 4,728,948 | 3/1988 | Fields | 340/825.15 |
| 4,816,822 | 3/1989 | Vache et al. | 340/825.15 |
| 4,845,418 | 7/1989 | Conner | 318/436 |
| 4,866,704 | 9/1989 | Bergman | 370/4 |

*Primary Examiner*—Douglas W. Olms
*Assistant Examiner*—Melvin Marcelo

*Attorney, Agent, or Firm*—Foley & Lardner

[57] ABSTRACT

There is disclosed a data acquisition system for use, for example, in a facility management system, for receiving analog input information, converting the analog input information to multiple-bit digital data, synchronizing the multiple-bit digital data to a serial transfer clock, and restoring the digital data into a bit-parallel format for storage in memory and subsequent digital processing. The data acquisition system includes a plurality of inputs, each input being arranged to receive analog input information. An analog-to-digital converter converts the analog input information at each input to a multiple-bit data word wherein the bits of the data word are in bit-parallel format. A multiplexer couples each of the inputs to the analog-to-digital converter one at a time in succession and a parallel input-serial output register converts the parallel bits to a serial digital bit stream. An optical coupling circuit conveys the serial digital bit stream to a serial-input parallel-output latch by optically processing both the serial digital data stream and transfer enable clock pulses. The latch reconverts the serial digital bit stream to parallel bits of data and holds the parallel bits of data for the direct access, parallel transfer thereof into a memory.

15 Claims, 3 Drawing Sheets

DATA ACQUISITION SYSTEM

BACKGROUND OF THE INVENTION

The present invention generally relates to data acquisition system and more particularly to a data acquisition system which receives analog input information, converts the analog input information to multiple-bit digital data, and provides the digital data in a bit parallel format for storage in memory and subsequent processing by a digital control unit.

There are many systems which digitally process data which was originally acquired in analog form. One such system is a control system commonly referred to as a facility management system.

Facility management systems are generally used to control the internal environment and provide security and fire alarm monitoring of, for example, an office building or plant facility. Internal room temperature, humidity, air flow, lighting, security, and fire alarm are among some of the conditions controlled and/or monitored by such systems. These systems provide this kind of control largely in response to analog information obtained from remote sensors which are connected by multiple wires back to the control systems. Such multiple wires are necessary to both convey the information relative to the condition sensed back to the control system and to enable the control system to provide power to those remote sensors which require external power. Because many different types of conditions are controlled by such systems, many different types of remote sensors may be utilized in such systems.

Since many different types of remote sensors may be required in a particular control system configuration, the analog information provided by the remote sensors can be represented by many different types of analog parameters. For example, a temperature sensor may provide an indication of the temperature sensed in the form of a resistance parameter. Other remote sensors may provide a voltage magnitude indicating the conditions sensed, and still other remote sensors may provide a current magnitude indicative of the condition sensed. In each such case, the information provided by the remote sensor is in analog form.

The control portion of facility management systems usually includes a plurality of input channels for receiving the analog information from the remote sensors. In order to read the analog information from the remote sensors, an improved control system disclosed in U.S. patent application Ser. No. 07/387,019 filed July 28, 1989 in the names of Gregory A. Pascucci and John Pierson, entitled Universal Analog Input, includes an interface which adapts each input channel for reading any type of analog information which may be conveyed to it by a remote sensor. The interface there disclosed converts the type of analog information provided by a remote sensor to the type of analog information which is readable by the input channels of the system. In addition, the interface is selectively operable for converting any one of the different types of analog information to a given type of analog information readable by the system inputs.

Facility management systems, of the type to which the present invention is directed, include a digital control unit or module which digitally processes data received from the remote sensors. As a part of this process, it is necessary for the digital control module to convert the analog information read at the system inputs to digital data to enable the digital processing of such data. Because facility management systems provide control of voltages and currents of relatively high magnitude at points in close proximity to the digital control module, the digital control module is thus located in an area of relatively high electrical noise. In addition, some of the devices controlled by such systems may be electrical motors or the like which can themselves generate electrical noise on the conductors which provide control of such devices.

Since the digital control modules process digital data having voltage magnitudes of comparatively low levels, it is necessary to assure that the digital data being processed is not subject to electrical noise interference. While shielding of the digital control module provides some degree isolation of the digital signals being processed from electrical noise, shielding alone is not sufficient to assure reliable digital processing of digital data within such systems.

It is therefore a general object of the present invention to provide a new and improved data acquisition system which receives analog input information and converts the analog information to digital data which is immune to electrical noise.

It is a further object of the present invention to provide a data acquisition system for receiving analog information which converts the analog input information to multiple-bit digital data and provides the digital data in a bit-parallel format for storage in memory and subsequent use by a digital control module.

It is a further object of the present invention to provide a data acquisition system which includes a plurality of inputs for receiving analog information, and which converts the analog information received at each such input to parallel bits of data for subsequent use by a digital control module wherein the parallel bits of data are immune from electrical noise.

It is a still further object of the present invention to provide a control system of the type which responds to analog input information received from a plurality of remote sensors and of the type which includes a digital control module for digitally processing the information received from the remote sensors, the control system including a data acquisition system for acquiring the remote sensor analog input information and converting the analog input information to parallel multiple-bit digital data for use by the digital control module, wherein the parallel multiple-bit digital data is immune from electrical noise.

It is a still further object of the present invention to provide such a data acquisition system which generates internal data transfer enable clock and control signals which are also immune from electrical noise to assure reliable provision of the digital data for use by the digital control module.

SUMMARY OF THE INVENTION

The invention provides a data acquisition system for receiving analog input information, converting the analog input information to multiple-bit digital data, and providing the digital data in a bit-parallel format for direct memory access storage. The system comprises an input for receiving the analog input information and analog-to-digital conversion means for converting the analog input information to a multiple bit-digital word, the bits of the digital word being in bit-parallel format. Parallel to serial bit means converts the parallel bits to serial bits and serial-to-parallel bit means receives and latches the serial bits as re-paralleled bits. The system further includes an optical coupler means connecting the parallel-to-serial bit means to the serial-to-parallel bit means for transferring the serial bits provided by the parallel-to-serial bit means to the serial-to-parallel bit means and providing immunity to electrical noise during such transfer.

The invention further provides a data acquisition system comprising a plurality of inputs, each input arranged to receive analog information and an analog-to-digital converter for converting the analog input information at each input to a multiple-bit data word, the bits of the data word being in bit-parallel format. The system further includes a multiplexer for coupling each of the inputs to the analog-to-digital converter one at a time in succession, first means for converting the parallel bits to a serial digital bit stream, and second means having an input for receiving the serial digital bit stream and means for reconverting the serial digital bit stream to parallel bits of data, the second means also being arranged to hold the parallel bits of data for the parallel transfer thereof into a memory. The system further includes an optical coupling circuit having an input coupled to the first means and an output coupled to the second means input for conveying the serial digital bit stream to the second means, the optical coupling circuit including an optical coupler for optically processing the serial digital bit stream to render the conveyance immune to electrical noise.

The system still further provides, in a control system of the type which responds to analog information received from a plurality of remote sensors and of the type which includes a digital control means for digitally processing the information received from the remote sensors, a data acquisition system for acquiring the remote sensor analog information and converting the analog information to parallel multiple-bit digital data for use by the digital control means. The data acquisition system comprises a plurality of inputs, each input arranged for receiving analog information from a respective given one of the remote sensors and an analog-to-digital converter for converting the analog information to digital data and providing the digital data in a multiple-bit parallel format, the analog-to-digital converter having an input. The system further comprises multiplexing means for selectively coupling each of the inputs to the analog-to-digital converter one at a time, parallel input-serial output means for converting the multiple-bit parallel digital data to serial data, optical coupling means coupled to the parallel input-serial output means for optically processing the serial data, and serial input-parallel output latch means coupled to the optical coupling means for receiving the optically processed digital data and providing the data for processing by the digital control means in a multiple-bit parallel format. The optical coupling means is arranged to transfer the digital data from the parallel input-serial output means to the latch means during the optical processing to render the digital data to be processed by the digital control means immune to electrical noise.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings, and in the several figures of which like reference numerals indicate identical elements and in which:

DESCRIPTION OF THE PREFERRED EMBODIMENT

Figure 1:
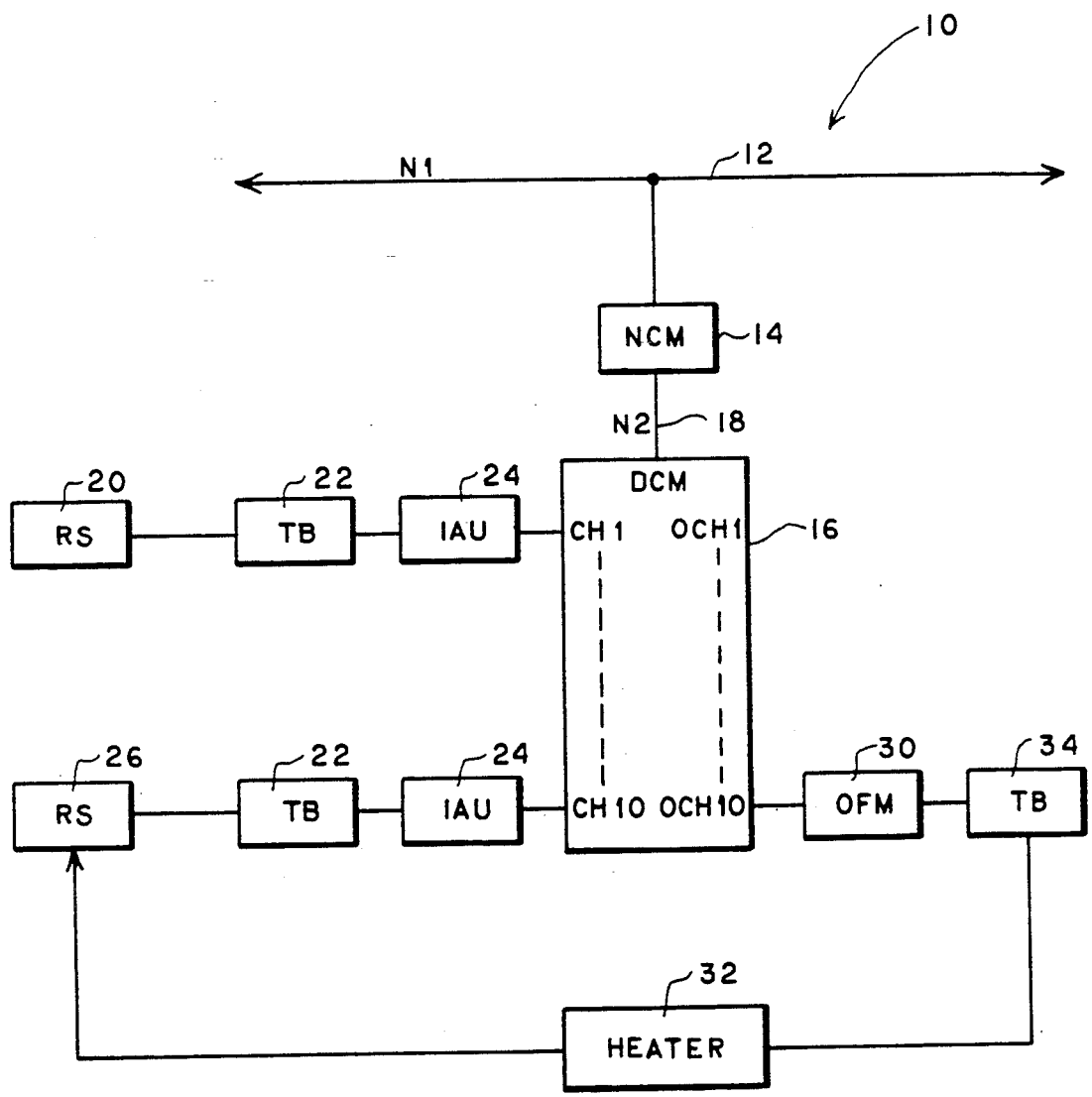
FIG. 1 is a block diagram of a control system which may utilize the data acquisition system of the present invention to advantage.

Referring now to FIG. 1, it illustrates a control system 10 which may utilize the present invention to advantage, and, more particularly, a facility management system embodying the present invention. The system 10 generally includes a main communication bus 12, which may be an N1 LAN ARCNET bus, a network control module 14, a digital control module 16, and another bus 18, which may be an N2 OPTOMUX bus, interconnecting the network control module 14 to the digital control module 16. LAN ARCNET and OPTOMUX buses 12 and 18 respectively are of a type well known in the art.

As illustrated in FIG. 1, the system there shown includes just one network control module and digital control module for exemplary purposes only, and it should be understood that additional network control modules and digital control modules may be connected to the main communication bus 12 in a practical system. This type of control system is referred to as a distributed system wherein each network control module is on a par with all other network control modules and communicates with all other network control modules on the bus 12.

The main function of the network control module is to communicate with other network control modules of the system on an equal basis and to control its associated digital control module under its own assigned software protocol. Such a protocol may include setting temperature control set points, heating schedules, lighting schedules, et cetera. The network control module, in accordance with its protocol, sends high level commands to the digital control module which then executes on those commands by performing closed-loop operations by issuing suitable control signals at its outputs responsive to sensed input conditions by its remote sensors.

The control signals issued by the digital control module can be both in digital or analog form. A digital control signal can be used to activate relays to in turn activate fan motor starting windings or to turn on heaters. An analog control signal can be used to power a damper motor to set a damper at a desired position. Hence, the digital control module performs decision-making processes, gathers information from its remote sensors, digitizes the information, digitally processes the information, and executes control functions to satisfy the high-level commands of the network control module.

The digital control module 16 thus processes digital information for performing various different types of closed-loop control operations within the system. To that end, the digital control module 16 may include ten output channels identified as OCH1 through OCH10. The outputs OCH1 through OCH10 provide the control signals to control the various different types of control elements of the system, such as relays or damper motors, to provide the desired control of the internal environment of, for example, an office building. As previously mentioned, relays controlled by the outputs of the digital control module 16 may, for example, turn on or off fan motors to establish desired air flow or heaters to establish desired room temperatures. Damper motors controlled by the digital control module 16 may be utilized to set a damper to also control air flow such as return air flow within a heating system.

In order to provide closed-loop control, the digital control module 16 may include 12 input channels CH1 through CH12; two of the twelve channels (CH11 and CH12) may be used to rectify circuit variances caused by circuit instabilities. Preferably, input channels CH11 and CH12 are internal to the digital control module 16 and are used to calibrate and adjust the analog input subsystem using software. Input channels CH1 through CH10 receive various different kinds of information from remote sensors within the system, which remote sensors provide analog input information of various types indicative of the conditions being sensed by the remote sensors. Since the information provided by the remote sensors is in the form of analog information, the input channels CH1 through CH10 are arranged to read analog input information. The analog information readable by each of the input channels is of a given type of analog information, and, in accordance with this preferred embodiment, is a differential voltage.

As previously mentioned, various types of remote sensors may be required within a facility management system. Because various types of remote sensors may be required, the analog information provided by the remote sensors may be of various different types of analog information. For example, a temperature sensor may take the form of a temperature dependant resistance so that the temperature sensor provides a resistance having a magnitude which is indicative of the temperature being sensed. Other types of remote sensors may provide analog information of the condition being sensed in the form of voltage magnitudes or current magnitudes carried through a two-wire current loop. As a result, the system 10 preferably includes a universal analog input as disclosed in the previously mentioned U.S. patent application Ser. No. 07/387,019, which application is incorporated herein by reference, which interfaces the remote sensors with the digital control module to convert the various different types of analog information provided by the remote sensors to the given type of analog information readable by the input channels CH1 through CH10 of the digital control module, and, preferably, a differential voltage.

To that end, the control system 10 of FIG. 1 is illustrated as including a remote sensor 20 which is coupled to the first input channel (CH1) of the digital control module by an input interface which includes a terminal block 22 and a universal analog input circuit (IAU) 24. Similarly, another remote sensor 26 is shown coupled to the tenth input channel (CH10) by an identical terminal block 22 and an identical universal analog input circuit 24.

The terminal block 22 is adapted for connecting the remote sensors to the control system. The universal analog input circuits 24 provide an interface disposed between the terminal blocks and the input channels. As disclosed in the aforementioned U.S. patent application Ser. No. 07,387,019, the universal analog input circuits are selectively operable for converting the type of analog information provided by their associated remote sensors to the differential voltage readable by their associated input channels. When the differential voltage at the input channels (CH1 through CH10) are read, these differential voltages are converted to another analog voltage having a magnitude indicative of the condition being sensed which is then received by the inputs of the data acquisition system of the present invention to be described hereinafter.

Since the digital control module includes ten output channels, it may perform up to ten separate closed-loop control operations. One such closed-loop control operation is illustrated in FIG. 1 in connection with the tenth output channel (OCH10). Output channel OCH10 is coupled to an output function module 30. The output function module 30 may be of many different types, and, for purposes of this description, will be assumed to be a relay. The output function module 30 is coupled to a heater 32 through a terminal block 34. When the relay of the output function module 30 closes, the heater 32 is turned on for heating an internal space such as a room of a building. The temperature of the room may be sensed by the remote sensor 26 which provides analog information in the form of a resistance having a magnitude indicative of the temperature being sensed. The resistance analog information provided by the remote sensor 26 is coupled to the tenth input channel (CH10) by the terminal block 22 and the universal analog input circuit 24. The temperature information from the remote sensor 26 is converted from a resistance magnitude to a differential voltage by the input interface formed by the terminal block 22 and the universal analog input circuit 24. When the differential voltage read at the tenth input channel (CH10) indicates that the room being heated by the heater 32 is at the desired temperature dictated by the high-level command of the network control module, the digital control module 16 through output channel OCH10 will open the relay of the output function module 30 to turn off the heater 32. When the room temperature falls below the desired temperature, that condition is sensed by the remote sensor 26, is converted to a differential voltage by the input interface including terminal block 22 and the universal analog input circuit 24 to a differential voltage, which then causes the digital control module to close the relay of the output function module 30 by its output channel OCH10. The foregoing closed-loop process continues until it is interrupted by either an operator, manually placing the output function module 30 into a manual mode, or by a command from the network control module 14 to the digital control module 16 through the bus 18. Such a command may be initiated under software control of the system. Such a software command may be desirable, for example, when the heat provided to portions of an office building is to be turned off at night or over weekends.

Figure 2:
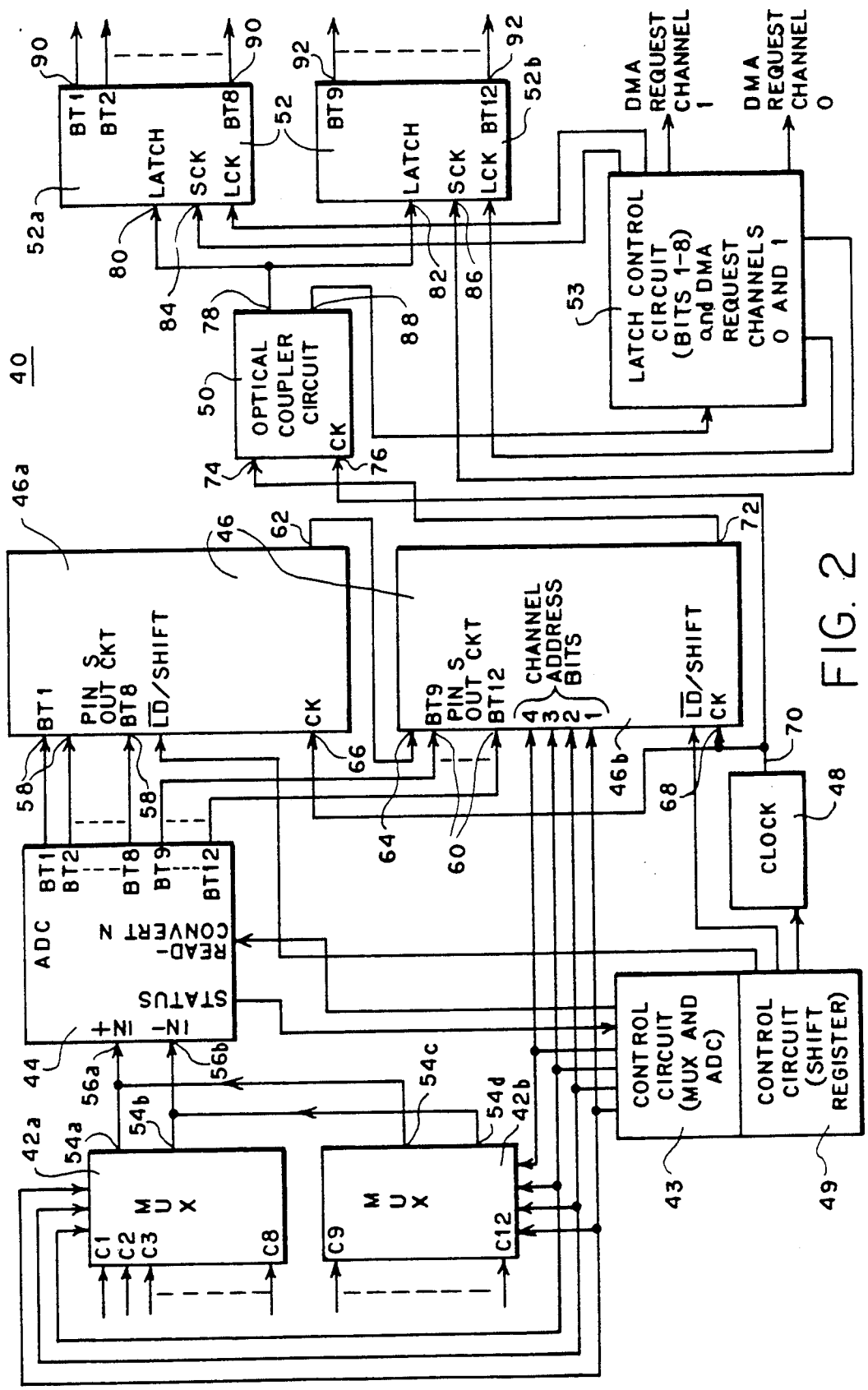
FIG. 2 is a schematic block circuit diagram of a data acquisition system embodying the present invention.

Referring now to FIG. 2, it illustrates a data acquisition system 40 embodying the present invention. The data acquisition system 40 generally includes multiplexers 42a and 42b, an analog-to-digital converter 44, a parallel input-serial output circuit means 46, a clock 48, an optical coupler circuit 50, control circuit 43 for multiplexers 42a and 42b and for analog-to-digital converter 44, control circuit 49 for parallel input-serial output, circuit means 46, a serial input-parallel output latch means 52, and control circuit 53 for latch means 52 and for direct memory access requests for DMA Channels 0 and 1.

The multiplexer 42a includes eight inputs C1 through C8 and multiplexer 42b includes four inputs C9 through C12, each of which inputs is coupled to a respective like-numbered channel input of the digital control module 16 of FIG. 1 for receiving at each of the inputs C1 through C12 an analog information signal derived from a respective one of the remote sensors coupled to the system 10 which is indicative of the condition being sensed. The multiplexer 42a includes outputs 54a and 54b and multiplexer 42b includes outputs 54c and 54d, all of which outputs are differentially coupled to inputs 56a and 56b of the analog-to-digital converter 44. The multiplexers 42a and 42b selectively couple of the inputs C1 through C12 to the inputs 56a and 56b of the analog-to-digital converter 44 one at a time in succession. Multiplexer 42a selectively couples channels C1 through C8 to analog-to-digital converter 44, and multiplexer 42b selectively couples channels C9 through C12 to analog-to-digital converter 44.

The analog-to-digital converter 44 converts the analog input information at its inputs 56a and 56b to a multiple-bit digital word with the bits of the digital word being in bit-parallel format at its outputs indicated at BT1 through BT12.

The parallel input-serial output circuit 46 includes a pair of parallel input-serial output registers 46a and 46b. Each of the registers 46a and 46b has a capacity for receiving eight parallel input bits. To that end, register 46a includes eight parallel inputs 58 and, register 46b also includes eight parallel inputs, four of which are utilized and indicated at reference character 60. As can be seen from FIG. 2, the eight parallel inputs of register 46a are adapted to receive bits one through eight from the analog-to-digital converter 44 and the four parallel inputs 60 of register 46b are adapted to receive bits nine through twelve of the analog-to-digital converter 44. Four channel address bits represent the remaining four parallel bits of register 46b, identifying the input channel number with the twelve output bits from the analog-to-digital converter 44. All sixteen bits are entered into the register 46 in parallel.

Register 46a includes an output 62 which is coupled to an input 64 of register 46b. In addition, register 46a includes a clock input 66 and register 46b includes a clock input 68. The clock inputs 66 and 68 are coupled to an output 70 of the clock 48. After all twelve bits of the parallel digital word of the analog-to-digital converter 44 and all four bits representing the channel address are loaded into the registers 46a and 46b, the clock signals from the clock 48 cause the parallel digital data in registers 46a and 46b to be converted to serial data and provided at an output 72 of register 46b.

Optical coupler circuit 50 includes an input 74 coupled to the output 72 of the register 46b. Also, optical coupler circuit 50 includes a clock input 76 coupled to the output 70 of clock 48.

Figure 3:
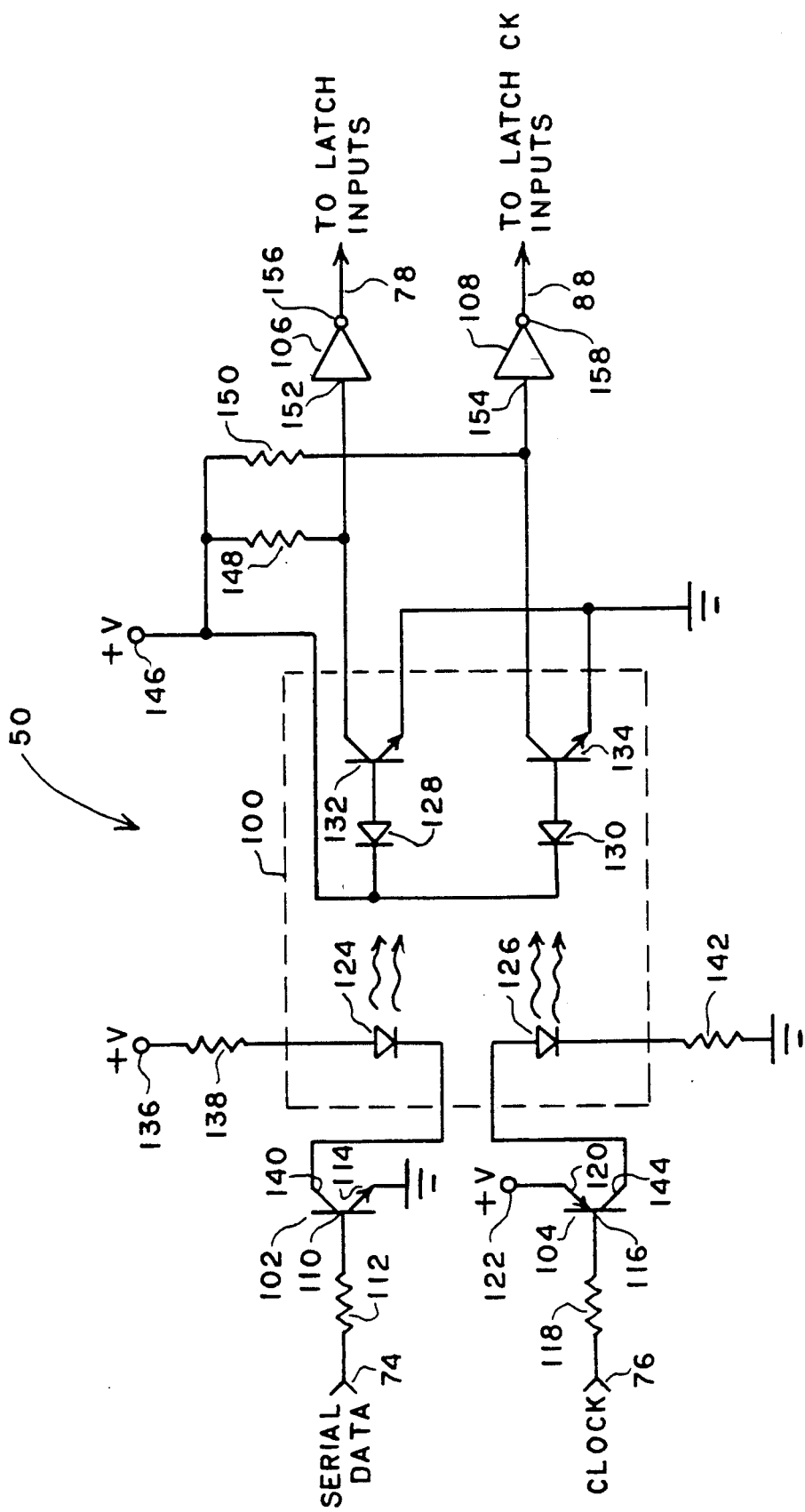
FIG. 3 is a schematic circuit diagram of an optical coupling circuit in accordance with the present invention.

As may be seen in more detail with reference to FIG. 3, the optical coupler circuit 50 includes an optical coupler 100 which optically processes the serial digital data received from the output 72 of the register 46b. As will also be seen with reference to FIG. 3, the optical coupler 100 of the optical coupler circuit 50 also optically processes the clock signals received at an input 76 from the output 70 of the clock 48.

The optical coupler circuit 50 also includes an output 78 from which the serial data is outputted to the latch 52. The latch 52 includes a pair of latch circuits 52a and 52b. Latch circuit 52a includes an input 80 for receiving the first eight bits of the serial data from output 78 of the optical coupler circuit 50 and latch circuit 52b includes an input 82 which receives the last eight bits of serial digital data from the output 78 of the optical coupler circuit 50. The latch circuits 52a and 52b further include clock inputs 84 and 86 respectively which are coupled to the clock output 88 of the optical coupler circuit 50. As will be described in greater detail with reference to FIG. 3, the optical coupler circuit 50 optically processes both the serial digital data and the transfer enable clock signals from the clock 48 to render the serial digital data and the clock enable signals immune to electrical noise which may be present in the facility management system 10 of FIG. 1.

As the sixteen bits of serial digital data is inputted into the latch 52, the serial data is re-converted to a multiple-bit parallel format and latched at the outputs 90 of latch circuit 52a and the outputs 92 of latch circuit 52b. As a result, the multiple-bit parallel formatted digital word is available at the outputs 90 and 92 of the latch 52 for direct memory transfer and subsequent digital processing by the digital control module 16 of the system 10 of FIG. 1.

Referring now to FIG. 3, there is illustrated in schematic circuit diagram form the optical coupler circuit 50 illustrated in FIG. 2. The optical coupler circuit 50 generally includes an optical coupler 100, a pair of transistors 102 and 104, and a pair of Schmitt trigger inverters 106 and 108.

Transistor 102 includes a base 110 which is coupled to the input 74 of the circuit 50 through a resistor 112. The emitter 114 of transistor 102 is coupled to ground.

Transistor 104 includes a base 116 which is coupled to the clock input 76 of the circuit 50 through a resistor 118. Transistor 104 also includes an emitter 120 which is coupled to a positive voltage supply (+V) at a terminal 122.

The optical coupler 100 includes a pair of light emitting diodes 124 and 126, photosensitive diodes 128 and 130, and transistors 132 and 134. The anode of diode 124 is coupled to a positive voltage source (+V) at a terminal 136 through a resistor 138. The cathode of light-emitting diode 124 is coupled to the collector 140 of transistor 102.

The cathode of light-emitting diode 126 is coupled to ground through a resistor 142. The anode of light-emitting diode 126 is coupled to the collector 144 of transistor 104.

Each of the light-emitting diodes 124 and 126 is associated with a respective one of photosensitive diodes 128 and 130. The cathodes of diodes 128 and 130 are coupled together and to a positive voltage source (+V) at a terminal 146. The anode of diode 128 is coupled to the base of transistor 132 and the anode of diode 130 is coupled to the base of transistor 134.

The collectors of transistors 132 and 134 are coupled to the positive voltage source (+V) at terminal 146 through resistors 148 and 150 respectively. The collectors of transistors 132 and 134 are also coupled to the inputs 152 and 154 of inverters 106 and 108 respectively. The emitters of transistors 132 and 134 are coupled to ground.

Inverter 106 includes an output 156 which is coupled to the output 78 of the optical coupler circuit 50. Similarly, inverter 108 includes an output 158 which is coupled to the clock output 88 of the optical coupler circuit 50.

As can be seen from the diagram of FIG. 3, when a positive data pulse is received at the input 74 of the optical coupler circuit 50, transistor 102 conducts to cause light-emitting diode 124 to be forward-biased and emit light. Similarly, when a negative clock pulse is received at the input 76, transistor 104 conducts to forward-biased light emitting diode 126 to cause it to emit light. The clock 48 is arranged to provide one such negative-going clock pulse for each data bit to be transferred through the optical coupler circuit 50.

The light emitted from the diodes 124 and 126 cause photoresponsive diodes 128 and 130 to conduct. When diodes 128 and 130 conduct, they turn on transistors 132 and 134 to place a low-voltage level at the inputs to inverters 106 and 108. The low inputs at the inverters 106 and 108 cause their outputs 78 and 88 to go high. The high-going pulse at output 78 is then coupled to the inputs of the latch 52 and the positive going clock pulses at output 88 are coupled to the clock inputs 84 and 86 of the latch 52.

As can thus be noted, the serialized digital data is transferred through the optical coupler circuit 50 and made available to the latch 52 in a manner which causes the serialized data to be immune from electrical noise. Similarly, the clock pulses from the clock 48 are transferred through the optical coupler circuit 50 and are made available to the clock inputs 84 and 86 of the latch 52 in a manner which also causes the clock pulses to be immune from electrical noise. As a result, it is assured that the digital data will be made available to the latch 52 in a reliable manner and that the clock pulses will also be made available to the latch 52 in a reliable manner. Both signals will be immune to electrical noise which, as previously mentioned, is a common occurrence in the control areas of facility management systems.

The reliably transferred digital data is thus provided at the outputs 90 and 92 of the latch 52 in a parallel-bit format. In this format, the paralleled bits of digital data are ready to be transferred in parallel into the memory of the digital control module 16 for subsequent processing by the digital control module 16.

Preferably, each input channel at the multiplexers 42a and 42b of FIG. 2 is converted into a multiple-bit digital data word as described above before the next channel of the multiplexer is addressed. This assures that the inputs to the multiplexer are free from transients which further increases the reliability of the data acquisition process.

While a particular embodiment of the invention has been shown and described, modifications may be made, and it is intended in appended claims to cover all such modifications as may fall within the true spirit and scope of the invention.

What is claimed is:

1. A data acquisition system for use in a facility management system for receiving analog input information, converting said analog input information to multiple-bit digital data, and providing said digital data in a bit-parallel format for direct access storage in memory, said data acquisition system comprising:
   an input for receiving said analog input information;
   analog to digital conversion means for converting said analog input information to a multiple-bit digital word, the bits of said digital word being in bit-parallel format;
   parallel to serial bit means for converting said parallel bits to serial bits;
   serial to parallel bit means for receiving and latching said serial bits as re-parallelled bits, said serial to parallel bit means including a clock input, and a transfer enable clock for providing a transfer enable clock signal for each said serial bit to be transferred; and
   optical coupler means connecting said parallel to serial bit means to said serial to parallel bit means, including a first input for receiving said serial bits of digital data, for transferring said serial bits provided by said parallel to serial bit means to said serial to parallel bit means and including a second input for receiving said transfer enable clock signal and transferring said transfer enable clock signal to said serial to parallel bit means clock input to provide immunity to electrical noise during said transfer.

2. A system as defined in claim 1 further including a plurality of said inputs for receiving analog input information and multiplexing means for selectively coupling each of said inputs to said analog to digital conversion means one at a time.

3. A system as defined in claim 1 wherein said parallel to serial means comprises a parallel input-serial output circuit.

4. A system as defined in claim 1 wherein said serial to parallel means comprises a serial input-parallel output latch.

5. A facility management data acquisition system comprising:
   a plurality of inputs, each said input arranged to receive analog input information;
   an analog-to-digital converter for converting the analog input information at each said input to a multiple-bit data word, the bits of said data word being in bit-parallel format;
   multiplexing means for coupling each of said inputs to said analog-to-digital converter one at a time in succession;
   first means for converting said parallel bits to a serial digital bit stream;
   a clock having an output for providing synchronous data transfer enable signals;
   second means having a first input for receiving said serial digital bit stream, a second input for receiving said synchronous data transfer enable signals, and means for reconverting said serial digital bit stream to parallel bits of data, said second means also being arranged to hold said parallel bits of data, said second means also being arranged to hold said parallel bits of data for the direct access parallel transfer thereof into a memory; and
   an optical coupling circuit having a first input coupled to said first means and a first output coupled to said second means first input for conveying said serial digital bit stream to said second means, and a second input coupled to said clock output and a second output coupled to said second means second input for conveying said synchronous data transfer enable signals to said second means, said optical coupling circuit including an optical coupler for optically processing said serial digital bit stream to render said conveyance immune to electrical noise.

6. A system as defined in claim 5 wherein said multiplexing means comprises a pair of multiplexers.

7. A system as defined in claim 5 wherein said first means comprises a parallel input-serial output circuit.

8. A system as defined in claim 5 wherein said second means comprises a serial input-parallel output latch.

9. A system as defined in claim 5 wherein said first means includes a clock input and wherein said clock output is also coupled to said first means clock input.

10. In a control system of the type which responds to analog information received from a plurality of remote sensors and of the type which includes a digital control means for digitally processing the information received from the remote sensors, a data acquisition system for acquiring said remote sensor analog information and converting said analog information to parallel multiple-bit digital data for use by said digital control means, said data acquisition system comprising:
a plurality of inputs, each said input arranged for receiving analog information from a respective given one of said remote sensors;
an analog-to-digital converter for converting said analog information to digital data and providing said digital data in a multiple-bit parallel format, said analog-to-digital converter having an input;
multiplexing means for selectively coupling each of said inputs to said analog-to-digital converter one at a time;
parallel input-serial output means for converting said multiple-bit parallel digital data to synchronous serial data;
a clock having an output for providing synchronous transfer enable clock signals;
optical coupling means coupled to said parallel input-serial output means and said clock for optically processing said serial data and said synchronous data transfer enable clock signals; and
serial input-parallel output latch means coupled to said optical coupling means for receiving said optically processed digital data and said optically processed synchronous data transfer enable clock signals and providing said data and said clock signals for processing by said digital control means, said data being in a multiple-bit parallel format, said optical coupling means being arranged to transfer said digital data and said synchronous data transfer enable clock signals from said parallel input-serial output means to said latch means during said optical processing to render said digital data and said synchronous data transfer enable clock signals immune to electrical noise.

11. A system as defined in claim 10 wherein each of said inputs has a unique address and wherein said system further comprises control means for conveying to said parallel input-serial output means a parallel bit address corresponding to the input providing said analog information to said analog-to-digital converter.

12. A system as defined in claim 10 wherein said multiplexing means comprises a pair of multiplexers.

13. A system as defined in claim 10 wherein said clock output is also coupled to said parallel input-serial output means.

14. A system as defined in claim 13 wherein said clock is arranged to provide a clock signal for each serial bit to be transferred through said optical coupling means to said latch means.

15. A facility management data acquisition system comprising:
a plurality of inputs, each said input arranged to receive analog input information;
an analog-to-digital converter for converting the analog input information at each said input to a multiple-bit data word, the bits of said data word being in bit-parallel format;
multiplexing means for coupling each of said inputs to said analog to digital converter one at a time in succession;
control means for generating a multiple-bit input address, said address controlling said multiplexing means;
parallel-to-serial bit means for combining said multiple-bit digital word with said input address and for converting the combined parallel bits to a serial digital bit stream;
a clock having an output for providing synchronous data transfer enable signals;
serial-to-parallel means having a first input for receiving said serial digital bit stream, a second input for receiving said synchronous data transfer enable signals, and means for reconverting said serial digital bit stream to parallel bits of data, said serial-to-parallel means also being arranged to hold said parallel bits of data for the direct access parallel transfer thereof into a memory; and
an optical coupling circuit having a first input coupled to said parallel-to-serial bit means and a first output coupled to said serial-to-parallel means first input for conveying said serial digital bit stream to said serial-to-parallel means, and a second input coupled to said clock output and a second output coupled to serial-to-parallel means second input for conveying said synchronous data transfer enable signals to said serial-to-parallel means, said optical coupling circuit including an optical coupler for optically processing said serial digital bit stream to render said conveyance immune to electrical noise.

* * * * *